Nov. 29, 1938.   E. ALTENKIRCH   2,138,688
METHOD AND APPARATUS FOR THE PRODUCTION OF COLD
Filed March 14, 1934
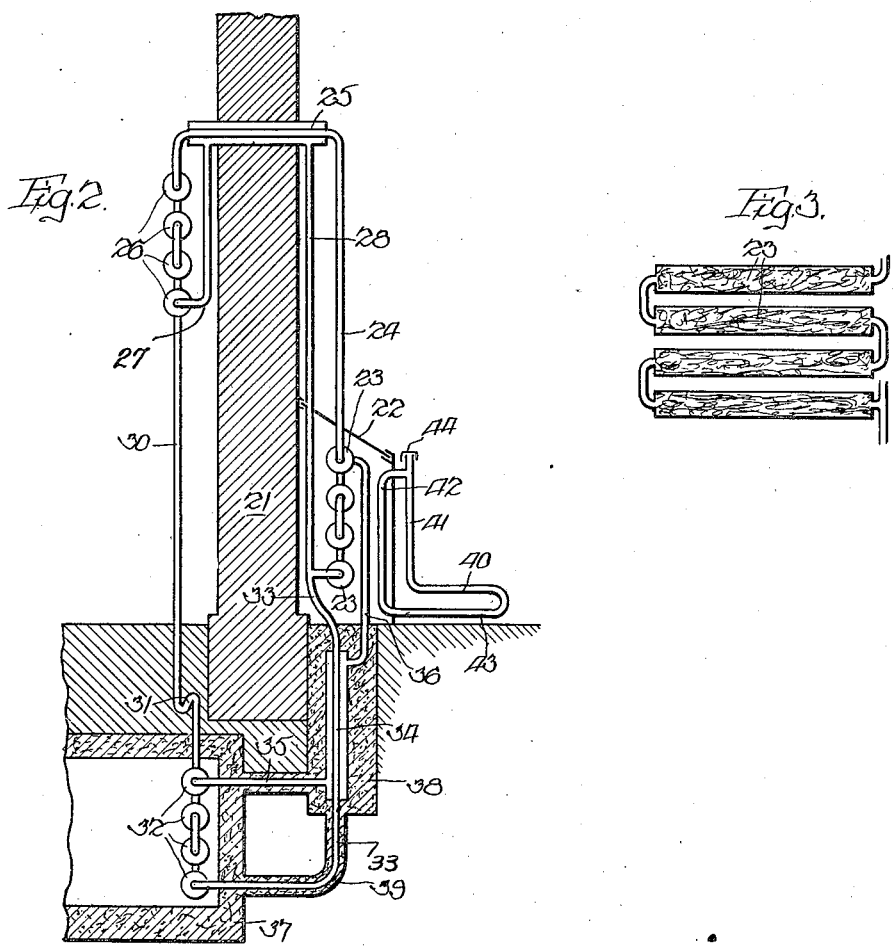
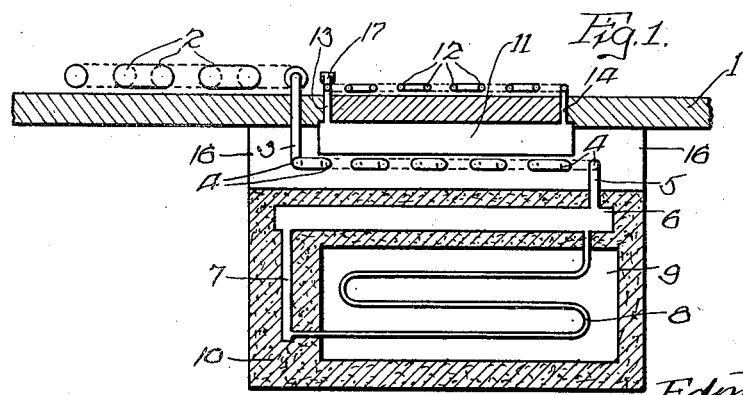
Inventor:
Edmund Altenkirch
By Harry S. Demaree
Atty.

Patented Nov. 29, 1938

2,138,688

UNITED STATES PATENT OFFICE 2,138,688

METHOD AND APPARATUS FOR THE PRODUCTION OF COLD

Edmund Altenkirch, Neuenhagen, near Berlin, Germany

Application March 14, 1934, Serial No. 715,446
In Germany June 16, 1933

21 Claims. (Cl. 62—118)

It is known to utilize the heat of the sun for the production of cold. To accomplish this, the generator of an absorption refrigeration unit may be heated by the sun while the condenser or the absorber of the unit is cooled by the air in the shade or by cooling water.

In many cases, however, water is not available for cooling and the air in the day time is too warm. A sufficient difference in temperature is often obtained between the temperature of the sun radiation during the day time and the temperature of the air during the night time. This difference in temperature is considerable, particularly if the climate is dry.

According to the present invention, an absorption refrigeration apparatus of the intermittent type may be operated to produce refrigeration as a result of this difference in temperature. The absorber-generator may be so constructed that it is heated directly or indirectly by sun radiation during the day time and is cooled by heat radiation to the air during the night time. The apparatus may be very simple, and yet operated in an efficient manner on account of the large temperature difference available on account of the fact that the apparatus is operating both during the day time and during the night time. The condenser may be cooled during the day time, even if cooling water is not available by cold stored during the night.

Under favorable conditions it will be possible to freeze ice during the night time according to the method mentioned. But even if it is not possible to obtain temperatures this low, the cooling effect produced can be utilized for cooling a bedroom in an apartment or for drying the air in a room. Larger size plants can also be used for procuring water in dry regions. As is well known, the dew point is often reached, even in dry regions, during the night time, by heat radiation from the earth. Therefore only a small decrease of air temperature during the night is necessary in order to gain water out of it.

Accordingly it is one object of the invention to provide a refrigerating apparatus capable of operating in response to the difference in temperature between that caused by the heat of the sun in the day time and the temperature of the air during the night time.

Another object of the invention is to provide a refrigerating apparatus in which inert gas circulates through certain vessels part of the time and through other vessels at other times.

A further object is to provide an hermetically sealed intermittent absorption refrigerating apparatus capable of operating in response to low differences in temperature.

A further object is to provide means for storing cold produced in the night time for use in the day time.

Other objects and advantages reside in certain novel features of the arrangement and construction as will be apparent from the following description, taken in connection with the accompanying drawing in which:

Figure 1 is a diagram showing an absorption apparatus of the intermittent type constructed in accordance with the invention.

Figure 2 is a showing of an intermittently operating apparatus containing neutral gas.

Figure 3 is a cross-sectional view of the absorption vessel shown in Figure 2.

Referring to the drawing in detail and first to Figure 1, the roof of a house is designated by 1. On the roof, the absorption vessel 2 and the pipes 12 of a circulating system are located. The circulating system is connected to the cold accumulator 11 by conduits 13 and 14 and has a vent pipe 17 which is covered with a lid. A conduit 3 connects the absorption vessel 2 to the condenser 4 which is, in turn connected to the liquid container 6 by the conduit 5. A large size pipe 7 connects the liquid container 6 with the evaporator 8 located in the cooled room 9. Container 6, pipe 7 and the cooled room 9 are heat insulated by the insulation 10. The condenser 4 and the cold accumulator 11 are in heat transfer relation with each other and are situated in the closed compartment 16.

If the sun shines on the roof during the day time, the refrigerant, for instance sulphur dioxide, is expelled out of the absorbent for instance silica gel, which is contained in the absorption vessel 2. The refrigerant flows through pipe 3 into the condenser 4, is liquified, as the result of the influence of the cold accumulator 11 and is collected in the liquid container 6.

The absorption vessel 2 is cooled during the night time by the night air so that the pressure in this vessel is decreased. Therefore during the night, the liquid in the evaporator 8 vaporizes and heat is taken up from the room 9 and a cooling effect produced. The vapor flows through pipe 5, condenser 4 and pipe 3 to the absorption vessel 2, and is absorbed again by the absorption medium in vessel 2. During the night, the liquid content of the pipes 12 is also cooled. Therefore cool liquid flows downwardly in one of the pipes 13 or 14, on account of its higher specific weight, and the warm liquid in the accumulator 11 rises in the other pipe and is cooled in 12. In this manner cold is accumulated during the night in order to cool the condenser during the day. No circulation is possible during the day time, because the liquid in pipe 12 is then warmer and lighter than that in accumulator 11.

Absorption apparatus of the kind described are subjected to large fluctuations of pressure and are very sensitive against other gases which may enter the apparatus. Difficulties in this respect can be avoided by introducing a neutral gas into these parts of the apparatus which contain vapor.

If solid substances are used as absorbents no contraptions are necessary in order to remove the absorbent from the evaporator as is necessary if a liquid is used as absorption medium. If an inert gas is circulated between the condenser and the absorber generator when the latter is heated and expelling refrigerant and between the absorber generator and the evaporator when the absorber-generator is acting as an absorber, refrigeration can be produced effectively. It is advisable to pass a smaller weight of gas through the condenser than through the evaporator. This can be done by adjusting the resistance to the gas flow within the system.

An apparatus operating with one day period and one night period and containing a neutral gas which circulates between the absorption vessel and the condenser during the day time and between the absorption vessel and the evaporator during the night time is shown in Figure 2. The apparatus of Figure 2 is designed to operate at quite low pressures. Where the temperature desired is not below 0° C., wood may be used as the absorbent, water as the refrigerant and air as the inert gas, with the pressure in the system at or below atmospheric. The south wall of the apparatus is designated by 21. This can be a single wall standing out in the open air or the wall of a house. At the south side (for northern regions) there is a glass window 22 under which an absorber-generator 23 is located. The absorber-generator is connected through pipe 24 and heat exchanger 25 with the condenser 26. A gas pipe 27 connects the lower part of the condenser 26 with the jacket of heat exchanger 25 which is in turn connected to the absorption vessel 23 through pipe 28. A portion of the absorption vessel 23 is shown as section in Figure 3.

The condenser 26 is connected with the evaporator 32 by conduit 30 which has a liquid seal at 31. The evaporator 32 is connected with the absorber-generator 23 by pipe 33, the pipe 33 passing through heat exchanger 34. The upper part of the evaporator is connected with the jacket of the heat exchanger through pipe 35. The jacket of the heat exchanger is connected to the upper part of the absorber-generator 23 through pipe 36. The room which contains the evaporator is protected against the entrance of heat by the insulation 37, and the heat exchanger is protected by insulation 38. The lower part of pipe 33 is also insulated as shown at 39. A heat transferring or circulating system 40, 41, 42, 43 is provided, this system having a vent 44 which is protected with a lid.

If the apparatus of Figure 2 is charged with air and water the natural gas circulation, due to convection may not be sufficient and fans or other circulators may be employed. If air and water are the working fluids, the pressure should be below atmospheric, if no fan or other circulator is employed.

The apparatus of Figures 2 and 3 operates in the following manner:

During the day time the sun shines on the absorber-generator 23 and on the pipes 40 and 41 of the circulating system. In this way, the absorber-generator 23 is heated and the refrigerant, for instance ammonia, is driven out of the absorbent, for instance activated charcoal, into the neutral gas, for instance air. In this manner the gas mixture becomes lighter and ascends by convection through pipe 24, passes through the heat exchanger 25 and enters condenser 26 where part of the ammonia is liquified. The condenser 26 may be cooled by air, by a spray of cooling water, or in any other known way. The gas mixture returns through pipe 27, heat exchanger 25 and pipes 28 and 29 into the absorber-generator 23 and takes up ammonia in this vessel again to begin a new cycle. The condensate liquified in condenser 26 flows through pipe 30 into the evaporator 32. Because of the relative location of the evaporator and the absorber-generator there is no gas circulation through the evaporator as long as the partial pressure of ammonia is higher in the absorption vessel than in the evaporator 32. Hence the condensate supplied to the evaporator at this time will not evaporate.

During the night time the absorber-generator 23 is cooled, for instance by opening the windows 22 or with the aid of the circulating system 40, 41, 42, 43. Therefore the partial pressure of ammonia in the gas mixture is decreased by the absorbing effect of the absorption medium. In this way, the gas mixture becomes heavier and sinks down into the evaporator 32 through pipe 33. In the evaporator the partial pressure of the ammonia is again increased by the evaporation of the accumulated ammonia thus causing a cooling effect. The gas mixture becomes lighter and ascends through pipe 35, heat exchanger 34 and pipe 36 to the upper part of the absorber-generator 23. Here it gives up its ammonia content and returns to the evaporator again.

The absorption refrigeration apparatus using neutral gas, described above, operates intermittently, the period of absorption and of expulsion taking place at different times. The gas circulation may be effected automatically as illustrated or by the use of known types of fans or other circulators not shown. It is obvious that the heating and cooling of the apparatus can be effected in various ways with or without the use of sun radiation during the day time. The apparatus is, however, particularly adapted for a day and night cycle because it accommodates itself to the conditions prevailing.

In some cases it is important that the fluids used be available at low cost for instance, in remote regions. In such cases water as refrigerant and air as neutral gas are particularly suitable. This combination is very effective, particularly if a low pressure prevails in the apparatus.

It will be apparent to those skilled in the art that various changes may be made without departing from the spirit of the invention or the scope of the annexed claims. Among these changes it may be noted that the relative position of the condenser and evaporator with respect to the absorber-generator of Figure 2 might be the reverse of that shown if the refrigerant used has a higher specific gravity than the inert gas and if a device is provided for lifting the condensate up into the evaporator. If mechanical circulators, such as fans are employed, the relative vertical position of the vessels is not so important.

I claim:

1. Refrigerating apparatus comprising a vessel capable of acting as an absorber, an evaporator, a condenser, means for causing an inert gas to circulate periodically between said vessel and said evaporator and means for causing an inert gas to circulate periodically between said vessel and said condenser.

2. Refrigerating apparatus comprising a vessel capable of acting as an absorber, an evaporator, a condenser, means for causing an inert gas to circulate periodically between said vessel and said evaporator and means for causing an inert gas to circulate periodically between said vessel and said condenser, the arrangement being such that the circulation of inert gas is brought about by heating and cooling certain parts of the apparatus.

3. Intermittent absorption refrigerating apparatus comprising an absorber-generator, an evaporator, a condenser, means for periodically circulating inert gas between the absorber-generator and the evaporator and means for periodically circulating inert gas between the absorber-generator and the condenser.

4. Intermittent absorption refrigerating apparatus comprising an absorber-generator, an evaporator, a condenser, means for periodically circulating inert gas between the absorber-generator and the evaporator and means for periodically circulating inert gas between the absorber-generator and the condenser, the arrangement being such that the circulation of inert gas is brought about by heating and cooling certain parts of the apparatus.

5. Intermittent absorption refrigerating apparatus comprising an absorber-generator, an evaporator, a condenser, means for periodically circulating inert gas between the absorber-generator and the evaporator and means for periodically circulating inert gas between the absorber-generator and the condenser, said absorber-generator being so arranged and constructed as to adapt it to be heated by the sun in the day time and cooled by the air in the night time.

6. Intermittent absorption refrigerating apparatus comprising an absorber-generator, a condenser, an evaporator, said absorber-generator being so arranged and constructed as to adapt it to be heated by the sun in the day time and cooled by the air in the night time thereby causing the apparatus to operate in a day and night cycle, and means for cooling the condenser in the day time and discharging the heat of condensation to the atmosphere in the night time.

7. The method of producing refrigeration which consists in periodically passing a stream of inert gas in a cycle between an absorbent body and a vessel in which refrigerant may condense, heating the absorbent body as the inert gas passes therethrough as described, to expel refrigerant therefrom into the inert gas, cooling the vessel to cause the refrigerant to condense therein, conveying the condensed refrigerant into an evaporator, causing the inert gas to periodically circulate between the evaporator and the absorbent body when not circulating between the absorbent body and the condenser to cause evaporation of refrigerant in the evaporator and cooling the absorbent body when inert gas is circulating between it and the evaporator to cause it to absorb refrigerant from the inert gas.

8. The method of producing refrigeration which consists in periodically passing a stream of inert gas in a cycle between an absorbent body and a vessel in which refrigerant may condense, heating the absorbent body as the inert gas passes therethrough as described, to expel refrigerant therefrom into the inert gas, cooling the vessel to cause the refrigerant to condense therein, conveying the condensed refrigerant into an evaporator, causing the inert gas to periodically circulate between the evaporator and the absorbent body when not circulating between the absorbent body and the condenser to cause evaporation of refrigerant in the evaporator and cooling the absorbent body when inert gas is circulating between it and the evaporator to cause it to absorb refrigerant from the inert gas, the heating and cooling of the absorbent body being brought about by exposing it to the heat of the sun in the day time and to the air in the night time.

9. In an absorption refrigerating system of the intermittent type and having an absorber-generator, a condenser and an evaporator, means for circulating inert gas between the condenser and the absorber-generator, and including a heat exchanger, and means for circulating inert gas between the evaporator and the absorber generator, and also including a heat exchanger.

10. In an absorption refrigerating system of the intermittent type and having an absorber-generator, a condenser and an evaporator, means for circulating inert gas between the condenser and the absorber-generator, and including a heat exchanger, and means for circulating inert gas between the evaporator and the absorber generator, and also including a heat exchanger the inert gas being circulated through both of said means under the influence of gravity.

11. The method of producing refrigeration in a system having an evaporator, a condenser, an absorber body, a refrigerant and an inert gas, which includes the steps of charging the absorbent body with refrigerant by circulating an inert gas through the evaporator and said body while cooling said body, for a period of time, and discharging said absorbent body by circulating the inert gas through the condenser and said body while heating the body by exposing it to the heat of the sun, for another period of time.

12. The method of producing refrigeration intermittently on a day and night cycle which includes the steps of vaporizing a liquid refrigerant into an inert gas in a zone to be refrigerated conveying the inert gas and vaporized refrigerant into an absorbing zone cooled by the night air, absorbing the refrigerant, discharging the absorbed refrigerant into the inert gas in the daytime by subjecting the absorbing zone to the influence of solar heat, conveying the inert gas and refrigerant into a condensing zone, condensing the refrigerant, and conveying the condensed refrigerant into the zone to be refrigerated.

13. The method defined in claim 12, wherein the inert gas circulates between the absorbing and refrigerated zones in the night and between the absorbing and condensing zones in the day.

14. The method of producing refrigeration on a day and night cycle which includes the steps of supplying refrigerant to a place of evaporation, vaporizing the refrigerant in the presence of a pressure equalizing medium, conveying the resulting mixture of refrigerant vapor and pressure equalizing medium into the presence of an absorbent for said refrigerant, rejecting the exothermic heat of absorption by causing said absorbent to be in heat exchange relationship with night air, and removing absorbed refrigerant from said absorbent by subjecting it to the action of solar heat and a stream of pressure equalizing medium.

15. That improvement in the art of producing refrigeration intermittently on a day and night cycle, which includes the steps of evaporating a liquid to produce refrigeration, absorbing the refrigerant vapor in an absorbing medium, rejecting the exothermic heat of absorption by subjecting the absorbing medium to cool night air, and discharging refrigerant from said absorbing medium by subjecting it to the action of solar heat and a moving body of pressure equalizing medium.

16. That improvement in the art of producing refrigeration intermittently on a day and night cycle which includes the steps of evaporating refrigerant into a body of pressure equalizing medium, conveying the resulting mixture into the presence of an absorbent for the refrigerant, rejecting the heat of absorption by subjecting the absorbent to cool night air, and discharging the refrigerant by subjecting the absorbent to the action of solar heat.

17. Intermittent absorption refrigerating apparatus comprising an absorber-generator, an evaporator, a condenser, means for periodically circulating an inert gas between the absorber-generator and the condenser, means for periodically conveying liquid refrigerant from said condenser to said evaporator, and means for periodically conveying refrigerant vapor from said evaporator to said absorber-generator.

18. That improvement in the art of producing refrigeration intermittently on a day and night cycle and involving the use of an absorber-generator, which includes the steps of absorbing heat in a refrigerant to evaporate said refrigerant into an inert gas and conveying the mixture of inert gas and refrigerant into the absorber-generator in the nighttime to absorb the refrigerant while cooling the absorber-generator by exposure to the night air, subjecting the absorber-generator to solar heat in the daytime, and conveying a current of inert gas through the absorber-generator in the daytime to carry off refrigerant discharged from the absorber-generator.

19. Intermittent absorption refrigerating apparatus comprising an absorber-generator, a condenser, an evaporator, said absorber-generator being so arranged and constructed as to adapt it to be heated by the sun in the daytime and cooled by the air in the nighttime thereby causing the apparatus to operate in a day and night cycle, and condenser cooling means comprising a coil element exposed to the atmosphere, a subjacent chamber positioned in heat transfer relationship with said condenser, a body of insulating material positioned between said coil and said chamber, and means connecting said coil and chamber to produce thermosyphonic circulation when the coil is cooled and to prevent such circulation when the coil is heated whereby the condenser is cooled in the daytime and the heat of condensation is discharged to the atmosphere in the nighttime.

20. Apparatus for producing refrigeration intermittently on a day and night cycle comprising an absorber-generator, an evaporator, means mounting said absorber-generator to be exposed to solar heat in the day and to the atmosphere in the night, means for supplying refrigerant to said evaporator, means connecting said evaporator and said absorber-generator to carry refrigerant vapor into said absorber-generator to be absorbed when the pressure therein has been lowered by the cooling action of night air, and means for relieving said absorber-generator of vapors generated therein by the action of solar heat whereby said apparatus operates to produce refrigeration at night.

21. Apparatus for producing refrigeration intermittently on a day and night cycle comprising an absorber-generator, an evaporator, a condenser, means mounting said absorber-generator to be exposed to solar heat in the day and to the atmosphere in the night, means for conveying condensate from said condenser to said evaporator, means connecting said evaporator and said absorber-generator to carry refrigerant vapor into said absorber-generator to be absorber when the pressure therein has been lowered by the cooling action of night air, and means for conveying vapors generator in said absorber-generator to said condenser when the temperature and pressure of said absorber-generator has been raised by the action of solar heat thereon.

EDMUND ALTENKIRCH.